United States Patent
Macke

(10) Patent No.: US 7,523,814 B2
(45) Date of Patent: Apr. 28, 2009

(54) DISC BRAKE HAVING AN ADJUSTING DEVICE, IN PARTICULAR FOR UTILITY VEHICLES

(75) Inventor: Wlodzimierz Macke, Olching (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/713,008

(22) Filed: Mar. 2, 2007

(65) Prior Publication Data

US 2007/0209887 A1    Sep. 13, 2007

Related U.S. Application Data

(63) Continuation of application No. PCT/EP2005/009368, filed on Aug. 31, 2005.

(30) Foreign Application Priority Data

Sep. 2, 2004    (DE) ...................... 10 2004 042 574

(51) Int. Cl.
*F16D 55/02*    (2006.01)

(52) U.S. Cl. ............... 188/71.8; 188/79.51; 188/196 F; 188/196 R

(58) Field of Classification Search ............... 188/71.9, 188/71.7, 79.51, 196 R, 196 F, 196 V, 72.8, 188/72.9, 71.8
See application file for complete search history.

(56) References Cited

U.S. PATENT DOCUMENTS 3,520,385 A * 7/1970 Beckman et al. ............ 188/345
4,030,577 A 6/1977 Ogawa et al.
5,379,867 A * 1/1995 Macke et al. ............... 188/71.9
5,568,845 A * 10/1996 Baumgartner et al. ...... 188/71.9
5,628,387 A 5/1997 Schantzen
5,848,673 A * 12/1998 Strauss et al. ........... 188/1.11 L
6,213,255 B1 * 4/2001 Neuwirth .................... 188/71.9
6,336,686 B2 * 1/2002 Thomas et al. ................. 303/2
6,668,981 B2 * 12/2003 Ortegren et al. ............ 188/72.2
6,955,246 B2 * 10/2005 Norman et al. ............ 188/71.8
7,182,184 B2 * 2/2007 Baumgartner ............... 188/156
2004/0149527 A1 8/2004 Norman et al.

FOREIGN PATENT DOCUMENTS

DE          103 00 013 A1    7/2004
WO        WO 02/14708 A2    2/2002
WO      WO 2004/070226 A1   8/2004

OTHER PUBLICATIONS

International Search Report dated Dec. 20, 2005 with English translation (Four (4) Pages).

* cited by examiner

*Primary Examiner*—Robert A Siconolfi
*Assistant Examiner*—Mariano Sy
(74) *Attorney, Agent, or Firm*—Crowell & Moring LLP

(57) ABSTRACT

A disc brake, particularly for utility vehicles, including a caliper that straddles at least some outer circumferential sections of a brake disc. A device for applying the brake is disposed entirely, or in part, in the caliper. A wear adjusting system is arranged in the caliper and is used for adjusting the lifting clearance between the brake pads and the brake disc. The wear adjusting system is provided with at least one adjusting device in the form of a rotary mechanism. A rechargeable energy accumulator, such as a flat coil spring, is provided as a drive unit for the rotary mechanism.

15 Claims, 3 Drawing Sheets

DISC BRAKE HAVING AN ADJUSTING DEVICE, IN PARTICULAR FOR UTILITY VEHICLES

CROSS-REFERENCE TO RELATED APPLICATIONS

This application is a continuation of PCT International Application No. PCT/EP2005/009368, filed Aug. 31, 2005, which claims priority under 35 U.S.C. § 119 to German Patent Application No. 10 2004 042 574.4 filed Sep. 2, 2004, the entire disclosures of which are herein expressly incorporated by reference.

BACKGROUND AND SUMMARY OF THE INVENTION

The present invention relates to a disc brake, in particular a disc brake for utility vehicles, having a brake caliper which straddles a brake disc at least in sections at its periphery, a brake application device, which is completely or partially arranged in the brake caliper, for applying the brake, and a wear adjusting system, which is arranged in the brake caliper, for adjusting the air play between brake pads and the brake disc. The adjusting system includes at least one adjusting device, preferably in the form of a rotary device.

A disc brake of the above-mentioned type is known from WO 02/14708, which disc brake can be embodied as a sliding caliper, a pivoting caliper, or a fixed caliper brake, in particular also with a displaceable brake disc.

To compensate for brake lining and/or brake disc wear, a wear adjusting system is arranged in the brake caliper, by which adjusting system the brake pads can be adjusted in the direction of the brake disc such that the spacing between the friction face of the brake lining of the brake pad and the brake disc, the so-called air play, is preferably kept constant.

In WO 02/14708, the adjusting system has at least one adjusting device in the form of a rotary device, which in one embodiment is driven electromotively and in another embodiment is driven mechanically. In the latter case, the brake application device is actuated by way of a brake lever coupled thereto.

Both functioning principles, i.e., electromotive and mechanical, have in common that the adjustment process is limited as a function of load, that is to say the adjustment is interrupted when the brake linings bear with frictional engagement against the brake disc.

The electromotive adjustment is, naturally, associated with a certain degree of design-related and production-related expenditures. This also encompasses special measures which are necessary to satisfy the harsh operating conditions under which disc brakes for utility vehicles are conventionally used.

The direct functional dependence of the wear adjusting system on the actuation of the brake application device does not allow an excess travel to be overcome. Moreover, the excess travel is under some circumstances only reduced once the adjusting system has been actuated several times, so that the functionality of the adjusting system is not optimally provided from the start.

In addition, the air play is conventionally adversely affected by the summing of several individual, for example production-related, tolerances. This also impedes optimum use of the wear adjusting system.

The present invention is, therefore, based on the object of further developing a disc brake of the above-mentioned type such that the function of the wear adjusting system is optimized with little structural expenditure.

This, and other, objects are achieved by a disc brake having a brake caliper which straddles a brake disc at least in sections at its periphery, a brake application device, which is completely or partially arranged in the brake caliper, for applying the brake, and a wear adjusting system, which is arranged in the brake caliper, for adjusting the air play between brake pads and the brake disc. The adjusting system includes at least one adjusting device, preferably in the form of a rotary device. A rechargeable force store is provided as a drive for the wear adjusting device.

The new disc brake is, firstly, characterized in that the improvement in functionality of the wear adjusting system may be provided using very simple structural means. In addition to cost-effective production and assembly, a further advantage to be highlighted is an improved robustness and relatively low susceptibility to failure, which naturally has a notable effect on a longer service life.

In principle, the wear adjusting system, that is to say of the rotary device, is actuated only indirectly as a function of the actuation of the brake application device, that is to say, the rotary device only becomes active when the air play has exceeded a certain nominal value.

The mechanical, load-dependent functioning of the new adjusting system makes it possible for any excess travel that may be present to be fully overcome already during a first actuation, thus resulting in an improvement in operational safety.

Also, the aggregate tolerance, discussed with regard to the prior art, which results from the direct actuation of the wear adjusting system by way of the brake application device and likewise impedes optimum functioning of the adjusting system, is no longer present as a result of the invention.

According to one advantageous refinement of the invention, it is provided that the force store is composed of a spring, in particular a spiral spring. The spiral spring is preferably fastened at its center to a positionally fixed pin, which is preferably connected to the brake caliper, and at the outside to a sleeve, which is arranged concentrically with respect to the pin. The sleeve is provided with an outer toothing and corresponds to the rotary drive, wherein, in the functional case of the internally-situated spiral spring, the sleeve rotates about the pin under the spring force of the spiral spring.

The force store is connected to a blocking device, which is unlocked when the air play exceeds a nominal value. In this case, the rotary device is actuated by the force store, preferably the spiral spring, such that the attached brake linings are moved indirectly towards the brake disc. The unlocking of the blocking device as the brake application device is actuated is preferably effected by way of a lever or another component, which is preferably attached to the blocking device. Here, the blocking device may be mounted by use of a disc so as to be axially displaceable and yet rotationally fixed on a shaft. The blocking device may have a crown toothing, which engages in a blocking toothing which is matched to the crown toothing, is positionally fixed in relation thereto, and is provided, for example, in the brake caliper.

The simple structural design is also notable here in particular because the function of the wear adjusting system is triggered by the actuation of the application device, and so no additional function parts are necessary for this purpose.

The shaft which supports the blocking device may be embodied as a coupling shaft, by which, in the case of the disc brake being embodied as a fixed caliper brake with a displaceable brake disc, adjusting devices arranged on both sides of the brake disc are actuated simultaneously, specifically by way of a common force store.

The force store, preferably in the form of a spiral spring, is designed such that, as the brake linings wear, its energy reserve, that is to say the spring force, is used up to such an extent that a final adjustment is still possible. By re-tensioning the spiral spring, that is to say turning it back counter to the rotational direction in the functional case, the force store is recharged.

Further advantageous embodiments of the invention are described and claimed herein.

Other objects, advantages and novel features of the present invention will become apparent from the following detailed description of the invention when considered in conjunction with the accompanying drawings.

BRIEF DESCRIPTION OF THE DRAWINGS

Exemplary embodiments of the invention are described in the following on the basis of the appended drawings, in which.

DETAILED DESCRIPTION OF THE DRAWINGS

Figure 1:
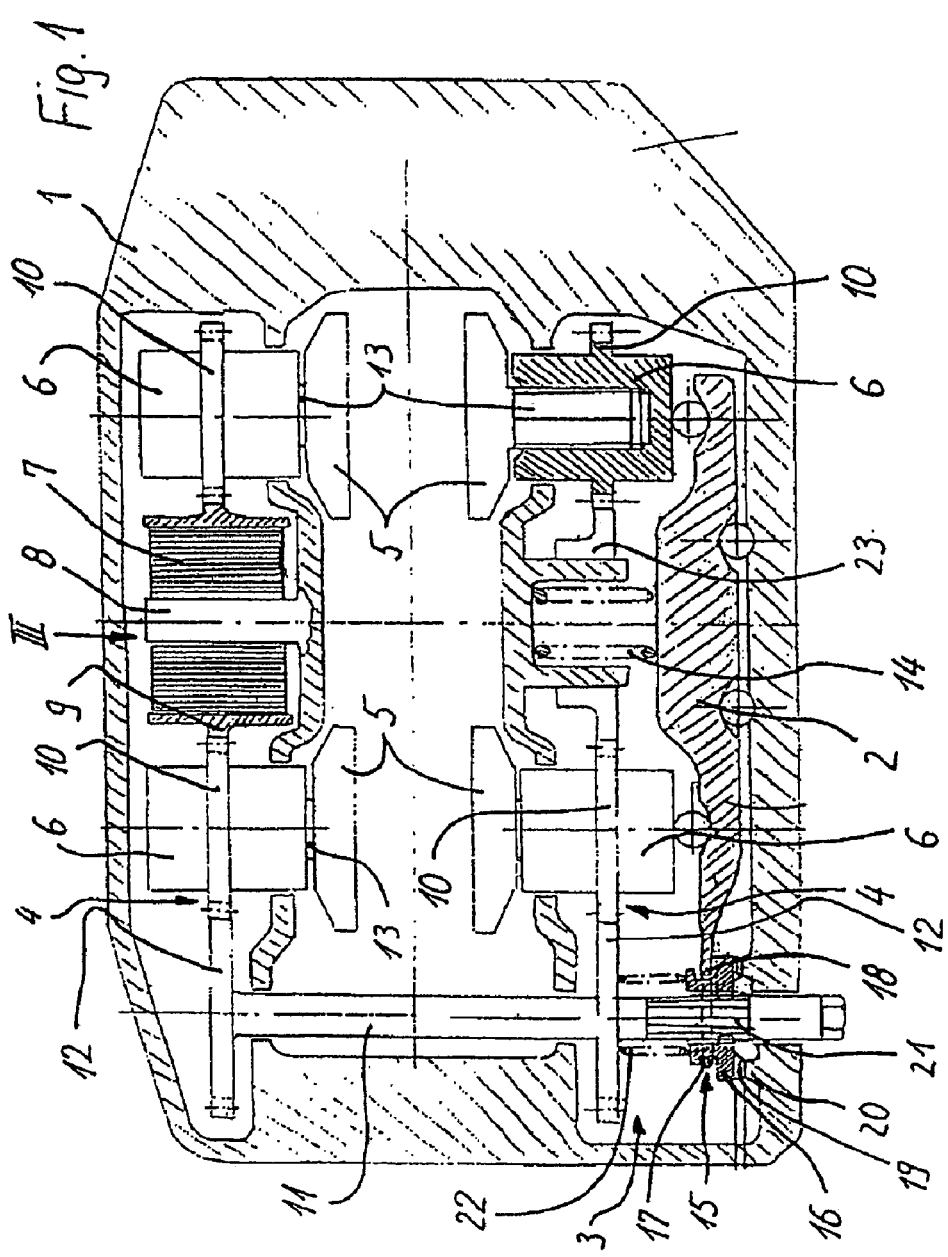
FIGS. 1 and 2 show different exemplary embodiments of a disc brake according to the invention in a partially-sectioned plan view.

FIG. 1 shows a disc brake embodied as a fixed caliper brake, having a brake caliper 1 which can be fixed to a vehicle and engages over a brake disc (not illustrated) at least in sections at its periphery. Part of a brake application device 2 for pressing a brake lining (not illustrated here) against the brake disc is arranged in the brake caliper 1. The brake caliper 1 is a fixed caliper, so that the brake disc is designed to be moveable. It is also contemplated to design the fixed caliper and the brake disc to each be slightly moveable, only to overcome the power stroke.

In order to adjust an air play between brake pads and the brake disc, a wear adjusting system 3 is provided in the brake caliper 1 which, in the exemplary embodiment shown in FIG. 1, has in each case one adjusting device 4 in the form of a rotary device on both sides of the brake disc.

Each wear adjusting device 4 is composed of two pressure pieces 5, which bear against brake pads (not illustrated) and are in each case mounted, by way of an attached threaded spindle 13, in an axially moveable manner in a spindle nut 6 which is rotatable relative thereto.

Figure 3:
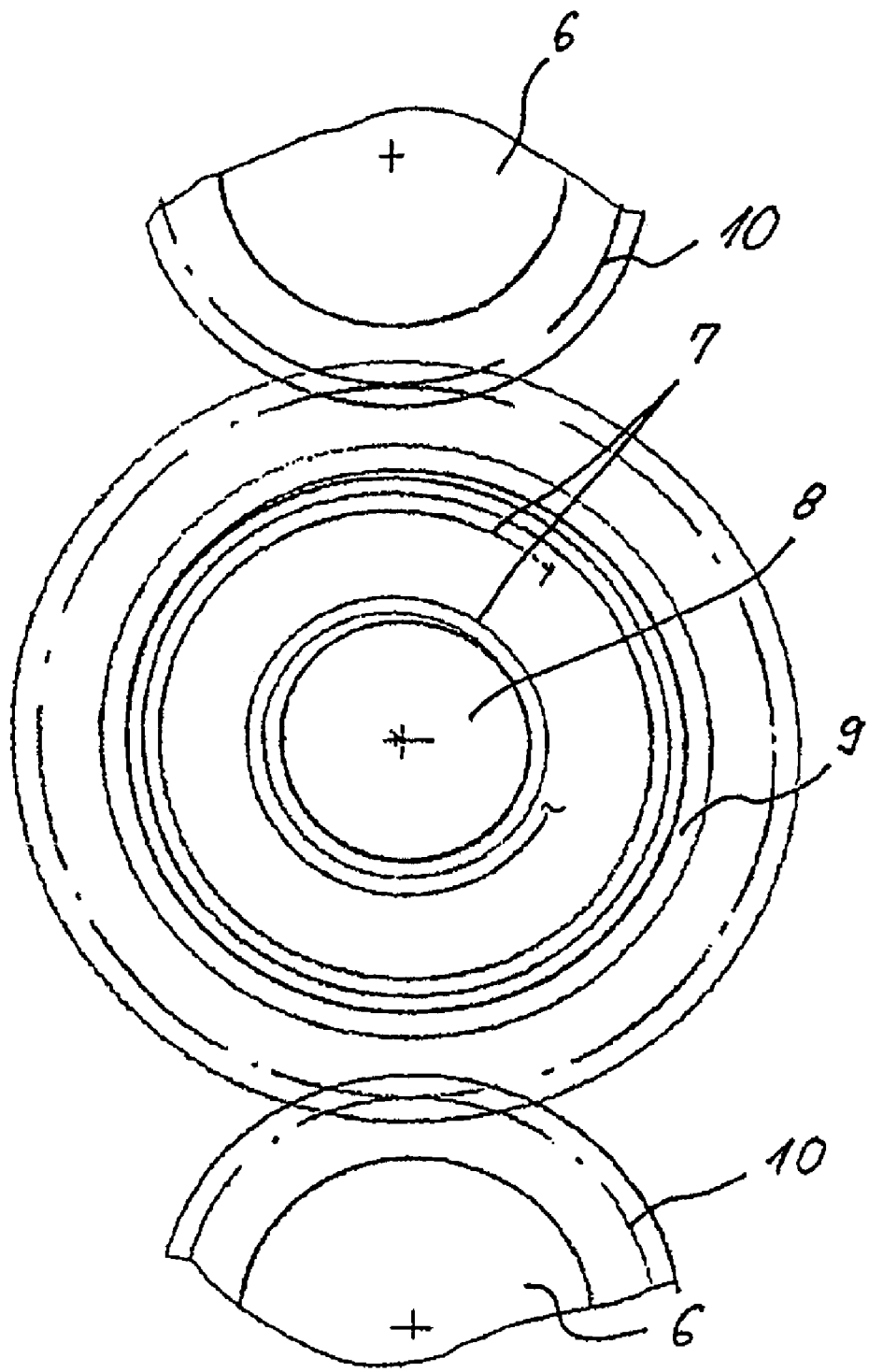
FIG. 3 shows a detail of the disc brake seen in the direction of the arrow III in FIG. 1.

A force store in the form of a spiral spring 7 is provided as a drive for the adjusting devices 4, that is to say the rotary devices of the entire adjusting system 3, the design of which spiral spring 7 can be particularly seen clearly from FIG. 3.

The spiral spring 7 is fastened at its center to a positionally fixed pin 8 of the brake caliper 1 while being fixedly connected at the outside to the wall of a sleeve 9 which surrounds the spiral spring 7 at the lateral surface side. When the spiral spring 7 is tensioned, the sleeve 9 can rotate about the pin 8 under the spring force.

At the outside, the sleeve 9 has an outer toothing which meshes with the teeth of a toothed ring 10 of the respective spindle nuts 6, with the sleeve 9 being arranged between two spindle nuts 6.

The toothed ring 10 of one spindle nut 6 engages into the teeth of a gearwheel 12, which is attached to a shaft 11. In the exemplary embodiment as per FIG. 1, the shaft 11 functions as a coupling shaft and transmits a rotary movement from the sleeve 9 via a further gearwheel 12 of the shaft 11 to the toothed rings 10 of the opposite spindle nuts 6 of the second adjusting device 4, with a further gearwheel 23 being interposed between the two spindle nuts 6 such that the latter rotate in the same direction.

The shaft 11 is formed, at least in regions, as a splined shaft 21 and, in the region, supports a blocking device 15 which is mounted in an axially displaceable yet rotationally fixed manner on the shaft 11.

The blocking device 15 has a disc 16, which is provided with a crown toothing 19 which, in order to block the shaft 11, engages in a blocking toothing 20 which is provided in a section of the brake caliper 1, that is to say is positionally fixed.

In addition, the disc 16 is provided with an encircling annular groove 17, which engages into a driver 18 of the brake application device.

The height of the teeth of the crown toothing 19 (or of the blocking toothing 20) preferably corresponds to a nominal value for the air play to be compensated between the brake linings and the brake disc. In principle, the height of the toothing is dependent on the ratio of the driver travel to the corresponding travel of the threaded spindle 13. If, for example, the travel of the driver 18 is greater than the adjustment path of the threaded spindle 13, then the toothing height is to be selected to be correspondingly larger.

As the brake application device 2 is actuated and the air play is overcome, the disc 16 is displaced axially on the splined shaft 21 of the shaft 11 by way of the driver 18.

In the case that the air play is greater than the nominal value, the blocking action of the blocking device is removed since the height of the teeth of the crown toothing 19 or of the blocking toothing 20 corresponds, as mentioned, to the nominal value of the air play, so that the shaft 11, which is under the load of the spiral spring 7, is rotated under the spring force of the spiral spring 7, with simultaneous rotation of the spindle nuts 6 both of the upper and of the lower wear adjusting devices 4, until the brake linings bear in a frictionally engaging manner against the brake disc. The correction of the air play is, therefore, completed during one single brake actuation.

If, in contrast, the air play does not exceed the predefined nominal value, then as the blocking device 15 is unlocked, the brake linings are pressed against the brake disc directly after the air play is overcome, wherein the spiral spring 7 does not become active.

After the brake is released, the brake application device 2 is returned by way of a return spring 14, and the disc 16 is returned by way of a pressure spring 22 into a blocking position.

Figure 2:
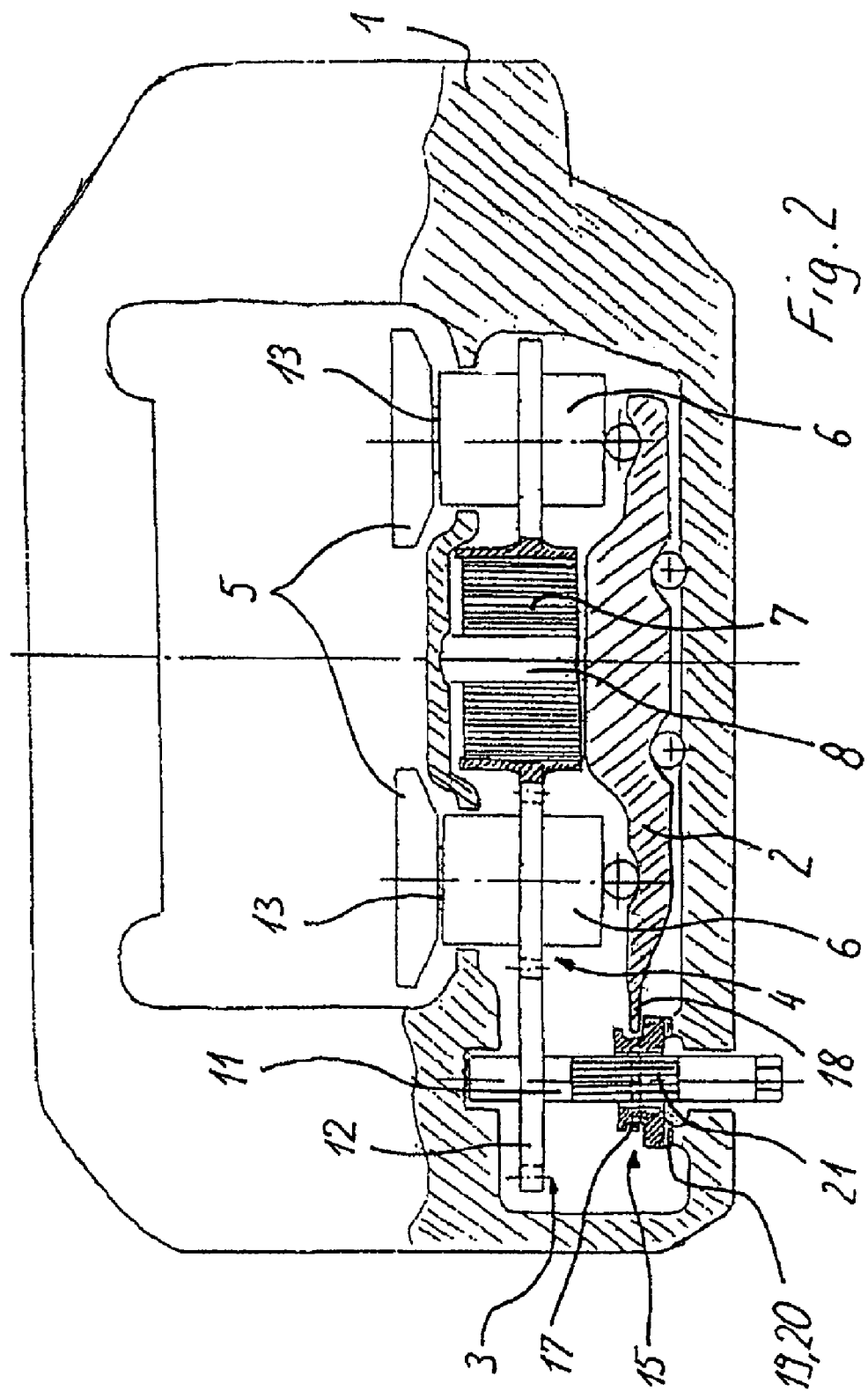

FIG. 2 schematically illustrates a sliding caliper brake, in which the wear adjusting system 3 has an adjusting device 4, which corresponds in principle to the design and function of that shown and described in FIG. 1, at only one side of the brake disc. A pivoting caliper brake could alternatively also be realized.

FIG. 3 shows a detail of the disc brake in which the arrangement of the spiral spring 7 in the sleeve 9, and the engagement of the outer toothing of the sleeve 9 into the toothed rings 10 of the adjacent spindle nuts 6, can be clearly seen.

Instead of the rotatable spindle nuts 6 and the threaded spindles 13 which are fixed thereto, as in the illustrated exemplary embodiments, it is of course also possible to position the spindle nuts 6 so as to be fixed and to rotatably mount the threaded spindles 13 therein, with the gearwheels 12 of the shaft 11 then communicating with corresponding toothings of the threaded spindles 13.

When replacing the linings, the threaded spindles are returned to an initial position by rotating the spindle nuts 6. The spiral spring 7 is re-tensioned by the opposite rotation of the spindle nuts 6.

TABLE OF REFERENCE NUMBERS

1 Brake caliper
2 Brake application device
3 Wear adjusting system
4 Rotary device
5 Pressure piece
6 Spindle nut
7 Spiral spring
8 Pin
9 Sleeve
10 Toothed ring
11 Shaft
12 Gearwheel
13 Threaded spindle
14 Return spring
15 Blocking device
16 Disc
17 Annular groove
18 Driver
19 Crown toothing
20 Blocking toothing
21 Splined shaft
22 Pressure spring
23 Gearwheel The foregoing disclosure has been set forth merely to illustrate the invention and is not intended to be limiting. Since modifications of the disclosed embodiments incorporating the sprit and substance of the invention may occur to persons skilled in the art, the invention should be construed to include everything within the scope of the appended claims and equivalents thereof.

What is claimed is:

1. A disc brake having a brake disc, comprising:
    a brake caliper which straddles the brake disc at least in sections at a periphery, thereof;
    a brake application device, which is completely or partially arranged in the brake caliper, for applying the brake;
    a wear adjusting system, which is arranged in the brake caliper and has at least one adjusting device in the form of a rotary device, for adjusting the air play between brake pads and the brake disc;
    a rechargeable force store formed as a spiral spring provided as a drive for the adjusting device;
    a blocking device for blocking actuation of the force store to within a nominal value of the air play;
    wherein the spiral spring is fastened at a center thereof to a positionally fixed pin and at an outside to a sleeve, which is arranged concentrically with respect to said pin and surrounds the spiral spring at a lateral surface side; and
    wherein the blocking device has a disc which is provided with a crown toothing which, in a blocked case, engages in a positionally fixed blocking toothing.

2. The disc brake as claimed in claim 1, wherein the sleeve has an outer toothing which meshes with a toothed ring of a spindle nut or of a threaded spindle; and
    further wherein the threaded spindle is mounted in an axially adjusted manner in the spindle nut and supports a pressure piece which bears against a brake pad.

3. The disc brake as claimed in claim 1, wherein the disc is unlockable by way of a driver of the brake application device.

4. The disc brake as claimed in claim 1, wherein the disc is mounted so as to be axially displaceable but rotationally fixed on a shaft, which runs parallel or approximately parallel to an application direction of the brake application device.

5. The disc brake as claimed in claim 3, wherein the disc is mounted so as to be axially displaceable but rotationally fixed on a shaft, which runs parallel or approximately parallel to an application direction of the brake application device.

6. The disc brake as claimed in claim 4, wherein the disc is mounted so as to be rotationally fixed and axially displaceable.

7. The disc brake as claimed in claim 6, wherein the disc is mounted on a splined shaft region of the shaft.

8. The disc brake as claimed in claim 5, wherein the driver of the brake application device engages in a peripheral groove of the disc.

9. The disc brake as claimed in claim 3, wherein a height of the teeth of the crown toothing or of the blocking toothing is dependent on a ratio of a travel of the driver to a corresponding adjustment path of the threaded spindle.

10. The disc brake as claimed in claim 9, wherein a height of the teeth of the crown toothing or of the blocking toothing corresponds approximately to a nominal value of the air play.

11. The disc brake as claimed in claim 1, wherein the spiral spring is arranged between two spindle nuts and is in rotatable engagement with the two spindle nuts.

12. The disc brake as claimed in claim 2, wherein the force store is rechargeable by turning back the spindle nut or the threaded spindle.

13. The disc brake as claimed in claim 1, wherein the disc brake is embodied as one of sliding and pivoting caliper disc brake and has at least one of the adjusting devices on one side of the brake disc.

14. A disc brake having a brake disc, comprising:
    a brake caliper which straddles the brake disc at least in sections at a periphery, thereof;
    a brake application device, which is completely or partially arranged in the brake caliper, for applying the brake;
    a wear adjusting system, which is arranged in the brake caliper and has at least one adjusting device in the form of a rotary device, for adjusting the air play between brake pads and the brake disc;
    a rechargeable force store formed as a spiral spring provided as a drive for the adjusting device;
    a blocking device for blocking actuation of the force store to within a nominal value of the air play;
    wherein the spiral spring is fastened at a center thereof to a positionally fixed pin and at an outside to a sleeve, which is arranged concentrically with respect to said pin and surrounds the spiral spring at a lateral surface side;
    wherein the caliper is fixed with an adjusting device being provided on both sides of the brake disc, which adjusting devices are drivable by a common force store; and
    wherein the adjusting devices on both sides are operatively connected by way of a shaft, which is embodied as a coupling shaft, with the shaft having two gearwheels, of which in each case one engages in a toothed ring of the associated adjusting device.

15. The disc brake as claimed in claim 14, wherein a pressure spring is guided on the shaft between a gearwheel of the shaft and a disc, by which pressure spring the disc is pressable into a blocking position.

* * * * *